United States Patent [19]
Roth et al.

[11] Patent Number: 5,056,740
[45] Date of Patent: Oct. 15, 1991

[54] OVER-THE-HORIZON TARGETING SYSTEM AND METHOD

[75] Inventors: Michael W. Roth, Columbia; Glenn E. Mitzel, Clarksville, both of Md.

[73] Assignee: The Johns Hopkins University, Baltimore, Md.

[21] Appl. No.: 411,138

[22] Filed: Sep. 22, 1989

[51] Int. Cl.⁵ .............................................. B64G 1/10
[52] U.S. Cl. ................................ 244/158 R; 89/1.11; 244/3.13; 244/3.15; 244/160; 244/138 R
[58] Field of Search ............... 244/158 R, 139, 138 R, 244/160, 3.13, 3.15; 455/12, 13, 98; 342/352-358, 372, 59; 89/1.11

[56] References Cited

U.S. PATENT DOCUMENTS

| | | | |
|---|---|---|---|
| 2,987,269 | 6/1961 | Weller | 244/3.13 |
| 3,301,511 | 1/1967 | Webb | 244/138 R |
| 3,443,779 | 5/1969 | Rogallo et al. | 244/138 R |
| 3,446,458 | 5/1969 | Rogallo | 244/138 R |
| 3,508,724 | 4/1970 | Scher et al. | 244/160 |
| 4,004,487 | 1/1977 | Eichweber | 244/3.15 |
| 4,240,601 | 12/1980 | Reed | 244/160 |

FOREIGN PATENT DOCUMENTS 3445387 6/1986 Fed. Rep. of Germany ...... 244/139

OTHER PUBLICATIONS

Hibben, "Report Stresses Space Structure Reuse", Aviation Week & Space Tech., Sep. 16, 1963, p. 71.

Primary Examiner—Galen Barefoot
Attorney, Agent, or Firm—Robert E. Archibald; Francis A. Cooch

[57] ABSTRACT

The invention is directed to either a satellite or missile deployed to a high altitude location at a desired position above a target. Once at the proper position a drogue chute is deployed to slow reentry and then a high-altitude balloon or paraglider is deployed to maintain the invention above the target area. Once deployed, the invention utilizes onboard sensors to collect target information which is communicated to an over-the-horizon (from the target) receiver.

12 Claims, 3 Drawing Sheets

OVER-THE-HORIZON TARGETING SYSTEM AND METHOD

STATEMENT OF GOVERNMENT INTEREST

The Government has rights in this invention pursuant to Contract No. N00039-89-C-5301 awarded by the Department of the Navy.

BACKGROUND OF THE INVENTION

The invention relates to systems which provide earth-based observers the capability to "see" over-the-horizon and, more particularly, to either a satellite or missile based system for collecting and communicating information about targets which are over the earth's horizon from the receiver of the information.

A fixed or large, slow-moving asset (such as a ship) is at a disadvantage when defending itself against a more mobile adversary because the adversary may relatively easily discover the ship's location. Moreover, the defense does not have targeting information until the adversary or its weapons come within range of the defensive sensing and targeting systems. Unfortunately for the defense, because of the high speed of modern weapons delivery systems, the time to respond is very compressed and places a strain on the defensive systems. Obviously, the more the defense can extend the range of its sensing and targeting systems, and thereby increase its time to respond, the lesser the advantage of the offensive adversary.

A number of systems such as airborne early-warning systems and relocatable over-the-horizon radar have been developed to provide long-range over-the-horizon surveillance. Those systems can provide detections with relatively coarse resolution, but they are limited in providing the kind of targeting information (such as the number and precise location of targets) required for the effective commitment of long-range defensive missiles.

Space-based sensor systems have been considered for surveillance missions, but their affordability is reduced when the additional requirements of targeting are imposed. Some of the reasons for the high costs of satellite systems are the long ranges at which the sensor must operate at orbital altitudes and the large number of satellites required by orbital dynamics in order to maintain surveillance and targeting capabilities over a single geographical area. Consequently, there is a need for a low-cost over-the-horizon targeting system.

A system for providing over-the-horizon targeting will, of necessity, be different from one providing over-the-horizon surveillance because of the different requirements of surveillance and targeting. Whereas both systems must provide a detection capability at long ranges from the defended asset, target information must be more timely and more accurate for a targeting system than for a surveillance system. Also, a surveillance system must be able to cover all areas of interest, while a targeting system can concentrate on smaller areas containing potential targets. A surveillance system must have continuous time coverage, whereas a targeting system only has to provide information when needed, e.g., during the course of an engagement. As with surveillance, a targeting system must be able to obtain information in all kinds of weather and to transmit that information to appropriate receiving stations in all kinds of electronic countermeasure environments. Finally, any system must be reasonably affordable.

SUMMARY OF THE INVENTION

The system of the invention meets both targeting and cost requirements not met by the airborne, radar and space-based surveillance systems described above. The invention's objective is to provide a low-cost, tactical over-the-horizon targeting capability with rapid delivery and long duration.

Once a broad targeting area is determined using existing identification, warning and surveillance assets, i.e., relocatable over-the-horizon radar, the invention is deployed to provide a local military commander with over-the-horizon targeting information. Either a satellite is de-orbited, or a missile is guided to a position above the previously determined broad target area, just before or in coordination with weapons release by the local commander to the desired target location. A drogue chute is deployed to slow reentry of either the satellite or missile and then a high-altitude balloon or a paraglider is deployed to maintain the sensors contained in the payload section of the satellite or missile at altitude. The sensors to collect target information are activated, and target information is communicated to the over-the-horizon receiver, i.e., the defended asset and weapons systems of the local military commander.

The targeting system just described provides rapid, on-call, reliable over-the-horizon targeting information when needed by the local military commander. Because the various elements of the system, e.g., drogue chute, balloon, sensors, are relatively small, they can be fitted into a suitably modified, off-the-shelf missile or in a small satellite, thus providing for a relatively low-cost system. Since, in the satellite version, the total number of satellites required for whole-earth coverage is small, the system cost remains relatively low.

For a more complete appreciation of the invention, attention is invited to the following detailed description of the invention taken with the figures of the drawings. The scope of the invention, however, is limited only through the claims appended hereto.

DETAILED DESCRIPTION OF THE PREFERRED EMBODIMENTS

Figure 1:
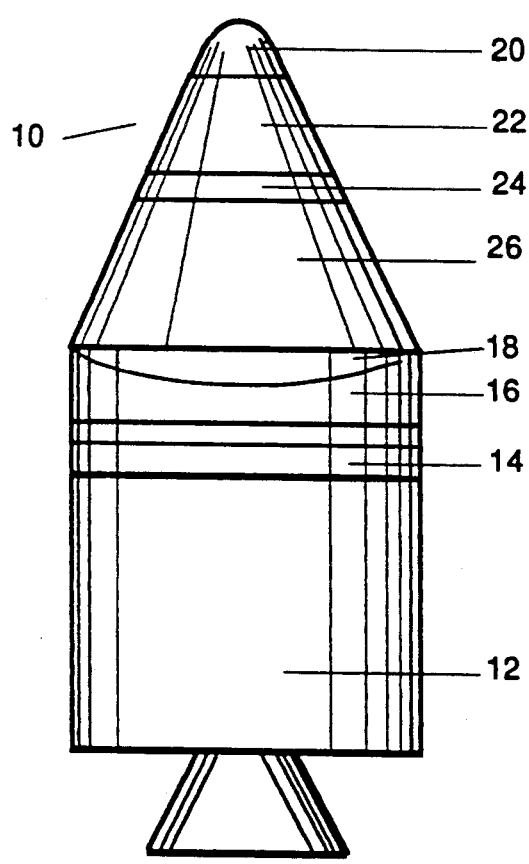
FIG. 1 illustrates a satellite-based embodiment of the invention.

An illustrative embodiment of the invention is shown in FIG. 1. This embodiment consists of a number of small, lightweight satellites, each satellite 10 being placed in earth orbit as part of a constellation in order to provide whole-earth coverage. A satellite 10 is then "called down", i.e., de-orbited, when needed by a military commander. The preferred satellite shape is the same as that of an Apollo capsule and final-stage, deorbit rocket because of their similar functions (a large orbital divert and high-reentry-drag capability). The relatively large de-orbit rocket 12 gives each satellite 10 a large footprint, i.e., the ability to cover a large geographical area, and lowers the number of satellites required for whole-earth coverage. The de-orbit rocket 12 uses liquid fuel to ensure the important restart capability discussed later. When a call-down command has been received by the antenna/receiver package 14, the guidance controls 16 cause the satellite de-orbit rocket 12 to ignite. Once rocket burn has been completed for de-orbit and reentry to a specific location, the de-orbit rocket 12 separates from the rest (payload) of the satellite 10, with the heat shield 18 in the reentry position.

At the designated altitude, the drogue chute 20 is deployed to slow the payload sufficiently so that a high-altitude balloon or flexible paraglider 22 can be deployed to maintain the payload at a position and altitude above the target. If a paraglider is used, a paraglider control package 24 is utilized to maneuver the paraglider. Once the payload is in position, the onboard, battery powered sensors in the sensor/communications/battery package 26 commence collecting target information at that location. The communications portion of package 26 then transmits the target information to a receiver, i.e., local military commander, who is waiting over-the-horizon from the target.

Figure 2:
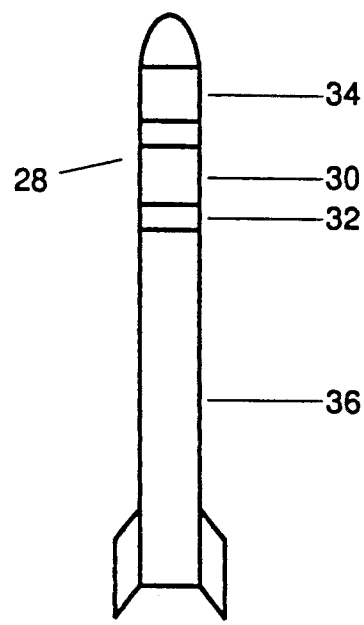
FIG. 2 illustrates a missile-based embodiment of the invention.

FIG. 2 illustrates the missile-based embodiment of the invention that is suitable for launch from a vertical-launch-system tube. This embodiment uses existing sensor/communications/battery technology that is characteristic of surface-to-air missile guidance systems. In an existing missile 28, in place of the usual ordnance module, a package containing the deployable high-altitude balloon 30 and the drogue chute 32 is inserted. Also present is a sensor/communications/battery module 34 which replaces the normal guidance module. The remaining rocket motor and propellant module 36 is configured to give the maximum delivery range. For a total lift-off weight of 4,100 pounds (burnout weight of 1216 pounds), the maximum range of approximately 580 nautical miles can be reached in about 7.8 minutes. For a shorter range of 250 nautical miles, the corresponding time is about 2.4 minutes. The missile-based system with short delivery times has a significant advantage over other systems when it is critical that targeting information be obtained as rapidly as possible.

Figure 3:
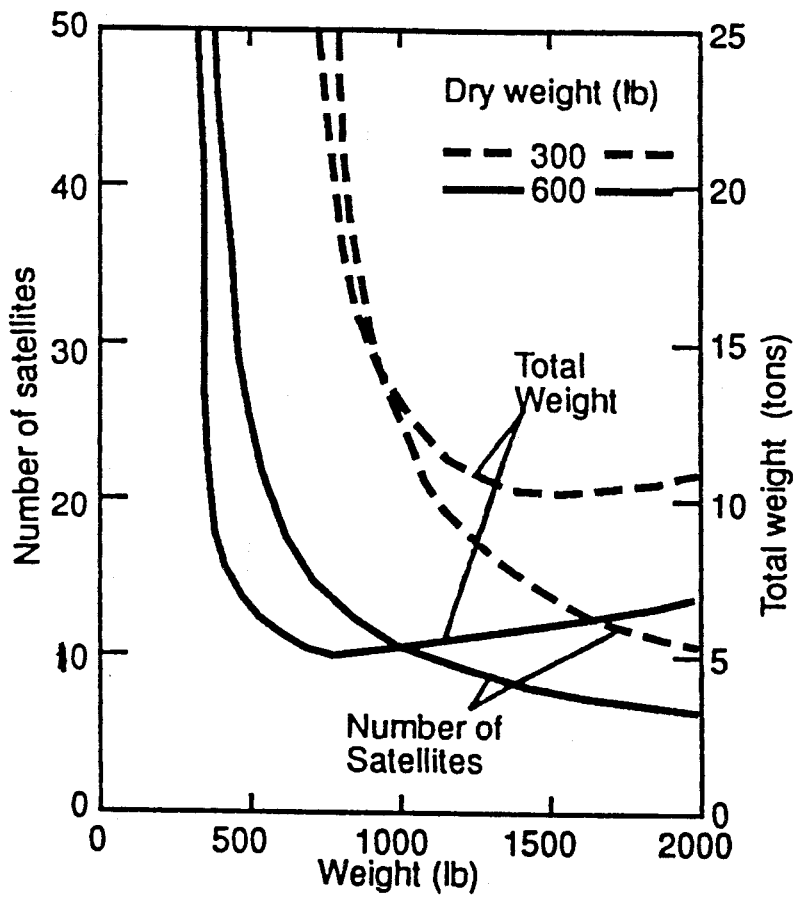
FIG. 3 is a graph illustrating the trade-off between the total number of satellites needed for whole-earth coverage and the total weight of a single satellite.

The satellite embodiment of the invention has an important design trade-off among the size of the de-orbit rocket, the size of the reentry footprint, and the number of satellites required for whole-earth coverage. FIG. 3 shows trade-off curves for a low-earth orbit, a maximum drawdown (or reentry) time of 22 minutes, and an average drawdown time of 15 minutes. The larger the de-orbit rocket and the greater the individual satellite weight, the larger the reentry footprint and the fewer the satellites required for whole-earth coverage. At some point, however, the total constellation weight starts to increase. The minimum weight occurs for a constellation of 13 satellites, which is quite a small number for a low-earth orbit constellation. Note that because the total constellation weight is quite low, launch costs can be expected to be minimal. If the number of satellites were increased for redundancy, the maximum drawdown time would be shortened correspondingly. For example, with a constellation of 52 satellites, the maximum drawdown time to any location on earth would be 11 minutes, with an average of 7 minutes.

The main reason for the large difference between the number of satellites needed for coverage compared to that typical of low-earth-orbit surveillance satellites is attributable to the difference between the reentry and sensor footprints. A low-earth-orbit sensor generally has a relatively small footprint with a radius of only a few hundred miles, because of such factors as sensor size requirements, affordability, and scan rate limitations. Therefore a large number of satellites are needed for whole-earth coverage. Although the invention also has a small sensor footprint, the satellite has a large reentry footprint because it uses a large de-orbit rocket that can significantly change the inclination as well as the de-orbit characteristics of the satellite. The reentry footprint is spherically triangular in shape with a length and width of several thousand miles, and therefore only a small number of satellites are needed for whole-earth coverage.

One consideration for low-earth-orbit constellations is replenishment cost because the atmospheric drag on such satellites shortens their orbital lifetimes. However, because the satellite of the invention is dormant in orbit and its power requirements are small, there is no need for solar arrays, which increase the drag and shorten the orbital lifetime. Consequently, the satellite's high ballistic coefficient leads to estimated orbital lifetimes in excess of several tens of years. Therefore, the effective lifetime of a satellite of the invention is more likely to be determined by system reliability considerations rather than by orbital decay resulting from atmospheric drag forces.

Figure 4:
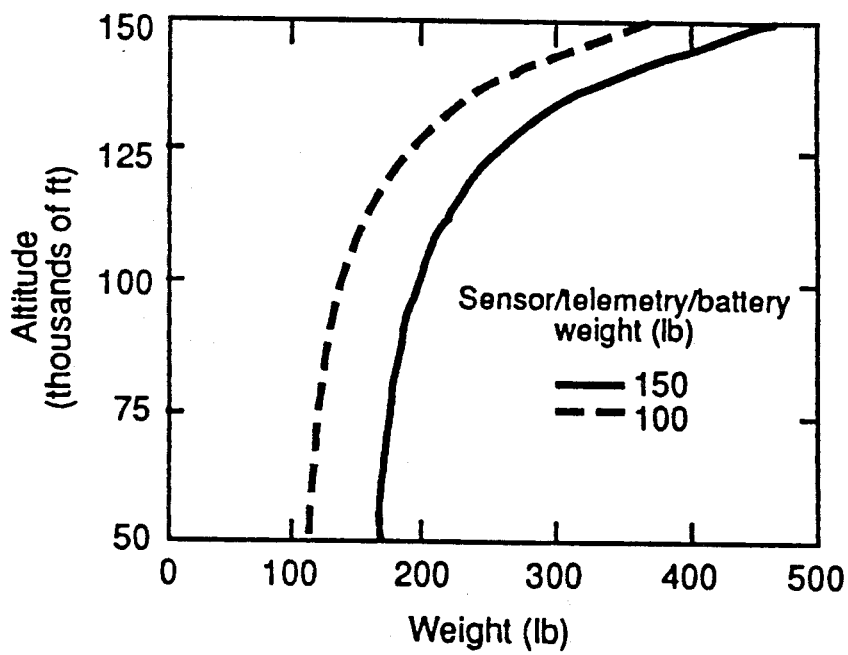
FIG. 4 is a graph illustrating the trade-off between the stable balloon altitude and final weight of the invention.

Another trade-off that is pertinent to all embodiments of the invention is the balloon weight required to achieve a final stable altitude. FIG. 4 shows a trade-off between total invention weight (sensor/communications/battery package plus balloon weight) and final stable altitude. The calculation used hydrogen as the balloon gas and a fabric weight of 0.35 ounce per square yard, which is characteristic of the various polyethylene high-altitude balloons used for scientific research. The dynamics of the atmosphere at altitudes above 100,000 feet is relatively benign with little or no weather variations and a steady wind of 10 to 20 knots. Once the invention is deployed, it will drift only slowly out of the geographical area of interest. Altitudes can be achieved that are well above the limit of existing air-to-air or surface-to-air missiles that use aerodynamic control surfaces, indicating that the invention may have a high degree of survivability after it is deployed at high altitude. Therefore, while no system, including the invention, is invulnerable to attack, this system has features that give it survivability advantages over alternative concepts such as remotely-piloted aircraft.

Figure 5:
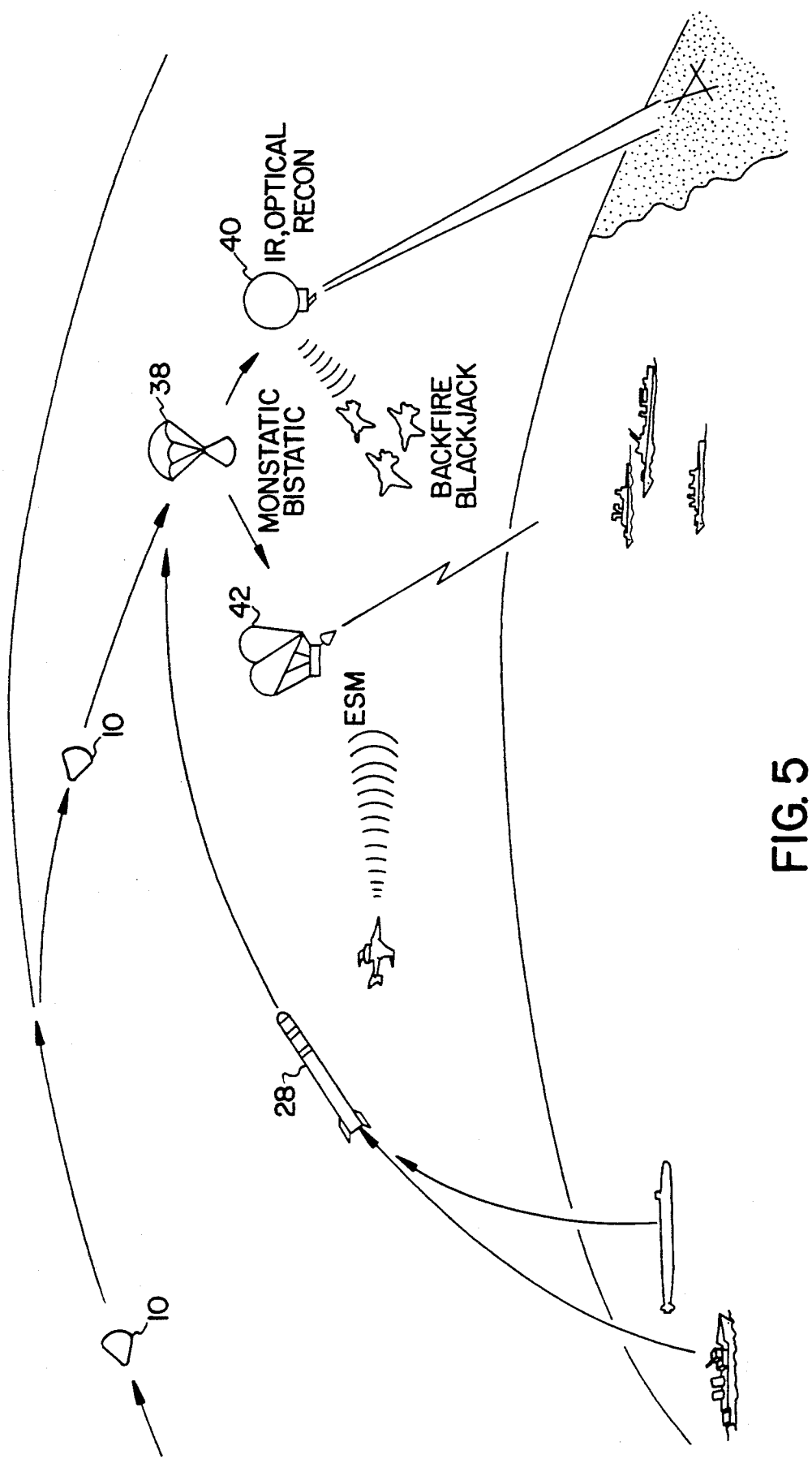
FIG. 5 illustrates both embodiments of the invention in operation.

FIG. 5 illustrates the operation of the invention. When over-the-horizon target information is required, the local military commander can de-orbit the nearest satellite 10 of the system's constellation of satellites or the commander can fire a missile 28 version of the system. Once in position above a target, both the satellite and missile deploy a drogue chute 38 to slow their speed and then either a balloon 40 or a paraglider 42 to maintain altitude above the target area. Sensors are then used to collect target information which is communicated to the local commander over-the-horizon.

Several features of the invention give it potential tactical significance. It provides sensor information on demand, so that if critical over-the-horizon information is required in a short time, the invention can be deployed to deliver it. The objective is to give a local military commander the capability to command the deployment of an information-gathering asset at his discretion. This objective would be the same for the satellite and the missile embodiments. Another advantage is that the invention, like a missile, is expendable. Although it could be recovered for reuse, its potentially low cost would make its loss less serious than, say, the loss of an aircraft.

Although it is expendable, the invention has a high degree of survivability, both deployed and in orbit, because of the high altitudes that can be attained. The small size of the payload and the transparency of the balloon material make it a difficult target. Even if an adversary were able to deliver ordnance against it, only the payload would be vulnerable to shrapnel because small holes in the balloon from shrapnel would only cause the balloon to sink slowly.

The satellite is small and would be difficult to detect and track in orbit. However, even if one or more are detected and destroyed, the capability of the constellation as a whole need not be degraded significantly. If the constellation consists of some multiple of the minimum number, then as the satellites are drawn down for use, the de-orbit rockets on the remaining satellites can be commanded to perform a small burn to reconfigure the orbits so that no gaps occur in the constellation. Consequently, no gaps need occur until the total number of satellites falls below the minimum number for total coverage. Thus, for an adversary to deny coverage by destroying the satellites, it would be necessary to eliminate almost the entire constellation.

The satellite embodiment of the invention would not take up any deck space on a ship whereas the missile-based version would occupy a vertical-launch-system tube slot that could otherwise be occupied by a missile. Another advantage of the satellite version is that it could be deployed without compromising the covertness of the defended commander's location.

Because the invention is comparable in size and complexity to surface-to-air and air-to-air missiles, and because mass-production techniques could be used to produce a number of units, the affordability of the invention will be comparable to that of missiles. Because the invention would be designed for both affordability and multiple-unit production, an appropriate reliability design goal could be selected instead of the ultrahigh reliability that is the design goal of most space systems. One aspect of affordability is not just the expected unit cost but also the expected total cost of the entire number required. Concepts of distributed small satellites have been studied for surveillance missions, but the very large numbers required (thousands) make the affordability of the total system an issue. Since the invention can be expected to service a number of weapon systems, the maximum number required can be estimated by dividing the total number of existing weapons by the expected number for which the invention would provide targeting data during deployment. Although the numbers vary with application, one estimate for over-the-horizon targeting of antiship missiles is that the number of satellites required would be no more than 10 percent of the number of missiles.

The invention is a reliable system for rapidly acquiring at low-cost critical over-the-horizon targeting information for the local commander. Its advantages such as survivability and expendability enhance its potential in combat situations. While the invention has been discussed in a military context, it could obviously have application in any situation where over-the-horizon information is needed, e.g., meteorology.

We claim:
1. An over-the-horizon targeting system comprising:
a satellite in earth orbit;
means for guiding said satellite to a position above a target;
a de-orbit rocket on said satellite which is ignited to decelerate said satellite;
a heat shield attached to said satellite to protect said satellite during de-orbiting;
a drogue chute which is deployed from said satellite to further decelerate said satellite to permit deployment of a maintaining means;
means for maintaining said satellite in said position above said target at an altitude which is above the limit of missiles that use aerodynamic control surfaces;
means for collecting information by said satellite about said target; and
means for communicating said target information to a receiver which is over-the-horizon from said target.
2. The targeting system as recited in claim 1, wherein said maintaining means comprises a balloon which is deployed from and attached to said satellite.
3. The targeting system as recited in claim 1, wherein said maintaining means comprises a paraglider which is deployed from and attached to said satellite.
4. The targeting system as recited in claim 3, wherein said maintaining means further comprises means for controlling said paraglider.
5. The targeting system as recited in claim 1, wherein said collecting means comprises:
means for sensing said target; and
means for powering said sensing means.
6. An over-the-horizon targeting system comprising:
a constellation of thirteen satellites in earth orbit to provide whole-earth coverage for said targeting system at a minimum constellation total weight, wherein a satellite in said constellation comprises:
means for guiding said satellite;
a de-orbit rocket on said satellite which is ignited to decelerate and de-orbit said satellite to a position above a target;
a heat shield attached to said satellite to protect said satellite during de-orbiting;
a drogue chute which is deployed from said satellite to further decelerate said satellite;
a balloon which is deployed from and attached to said satellite to maintain said satellite in said position above said target at an altitude of at least 100,000 feet above sea level;
means for sensing said target;
means for powering said sensing means; and
means for communicating information about said target collected by said sensing means to a receiver which is over-the-horizon from said target.
7. A method for targeting over-the-horizon comprising the steps of:
placing a satellite in earth orbit;
guiding said satellite to a position above a target;
igniting a de-orbit rocket on said satellite to decelerate said satellite;
protecting said satellite during de-orbiting with a heat shield attached to said satellite;
deploying a drogue chute from said satellite to further decelerate said satellite to permit maintaining said satellite in said position above said target;

maintaining said satellite in said position above said target at an altitude which is above the limit of missiles that use aerodynamic control surfaces;

collecting information by said satellite about said target; and communicating said target information to a receiver which is over-the-horizon from said target.

8. The method as recited in claim 7, wherein said step of maintaining said satellite in said position above said target comprises the step of deploying a balloon from said satellite, said balloon being attached to said satellite.

9. The method as recited in claim 7, wherein said step of maintaining said satellite in said position above said target comprises the step of deploying a paraglider from said satellite, said paraglider being attached to said satellite.

10. The method as recited in claim 9, wherein said step of maintaining said targeting systems in said position above said target further comprises the step of controlling said paraglider.

11. The method as recited in claim 7, wherein said step of collecting information comprises the steps of:

powering a means for sensing said target; and sensing said target.

12. A method for targeting over-the-horizon comprising the steps of:

placing a constellation of thirteen satellites in earth orbit to provide whole-earth coverage for said targeting at a minimum constellation total weight, wherein deploying a satellite in said constellation comprises the steps of:

guiding said satellite;

igniting a de-orbit rocket on said satellite to decelerate and de-orbit said satellite to a position above a target;

protecting said satellite during de-orbiting with a heat shield attached to said satellite;

deploying a drogue chute from said satellite to further decelerate said satellite;

deploying a balloon from said satellite, said balloon being attached to said satellite to maintain said satellite in said position above said target at an altitude of at least 100,000 feet above sea level;

powering a means for sensing said target;

sensing said target; and communicating information about said target collected by said means for sensing said target to a receiver which is over-the-horizon from said target.

* * * * *